Patented July 2, 1946

2,402,975

UNITED STATES PATENT OFFICE 2,402,975

ACTIVATING COMPOSITIONS

Frederick V. Nugent, Abington, Mass., assignor to B. B. Chemical Co., Boston, Mass., a corporation of Massachusetts No Drawing. Application March 18, 1943, Serial No. 479,627

2 Claims. (Cl. 260—32)

This invention relates to plastic compositions and more particularly to compositions embodying polyvinyl butyrals.

Polyvinyl butyrals are available commercially as "Butacite" (E. I. du Pont de Nemours & Co., Inc.), "Butvar" (Shawinigan Products Corp.) and "Vinylite" Series X resin, for example "XYSG" (Carbide & Carbon Chemicals Corporation).

The polyvinyl butyrals have desirable properties for use as adhesives because of their toughness and flexibility and their excellent adhesion to many materials including fabrics and leather.

In cementing materials together by means of polyvinyl butyral, it is common practice to apply a solution of polyvinyl butyral to the attaching surfaces of the materials to be joined and to permit such cement surfaces to dry. Then the hardened cement is activated and the materials pressed together with the cemented surfaces in juxtaposition. The activation of the cement has been by heat or by the use of a solvent for polyvinyl butyral.

The activation of polyvinyl butyral cement by heat has been advantageous, in that following such activation it has been necessary to maintain the parts together under pressure for only a short period of time. On the other hand, in addition to requiring special apparatus, the subjection of the polyvinyl butyral cement to the necessary heat in certain cases has imparted to the resulting cement bond the characteristic of "cold flow," evidenced by a gradual separation of the parts so joined.

The activation of the polyvinyl butyral cement by means of a solvent readily may be accomplished, but due to the solvent-retaining characteristics of polyvinyl butyral it is necessary, following the activation, to maintain the parts under pressure for relatively long periods of time until the cement bond acquires sufficient strength to hold the parts together without the aid of pressure, for example 20 minutes or longer, a feature which is frequently undesirable.

In view of the above considerations an object of this invention is to provide a composition for activating polyvinyl butyral cement which will not adversely affect the character of the resulting adhesive bond, and by the use of which cemented parts need be maintained under pressure for only a short period of time.

In view of the above and other objects I have discovered that in spite of the unusually high solvent-retaining characteristic of polyvinyl butyral, an activating composition comprising polyvinyl butyral and a liquid vehicle which itself comprises solvent for polyvinyl butyral and nonsolvent therefor is highly effective in producing a cemented bond of high quality and in requiring the maintenance of the parts under attaching pressure for only a very short time. Such composition activates polyvinyl butyral cement quickly, and readily may be confined to the area of the cemented surface to be activated. Furthermore, after the cemented parts have been placed in juxtaposition and under attaching pressure, the strength of cement bond rapidly develops to such a degree that the attaching pressure may be released within a short time, for example a minute, and this result occurs even though the parts to be joined may have a tendency to spring away from each other.

The invention advantageously may be illustrated in its application to the adhesive attachment of outsoles to shoe uppers. Thus, the overlasted margin of a leather shoe upper may be suitably roughed by means of a wire brush. The marginal portion of the attaching surface of a leather sole similarly may be roughed. To each of the roughed surfaces a layer of polyvinyl butyral cement of the following composition may be applied:

| | | |
|---|---|---|
| Butacite (polyvinyl butyral) | grams | 471 |
| Plasticizer 3 GH | do | 77 |
| Synasol (proprietary denatured ethanol) | do | 2610 |
| Yield | gallon | 1 |

The cement may be applied to the roughed overlasted margin of the shoe upper and to the roughed margin of the attaching surface of the outsole in the form of marginal bands about one-half inch wide. The cement application may be by means of a brush, or by suitable mechanical means. The cement on the shoe parts may be permitted to dry for a period of about one hour or longer.

The cement may be rendered adhesive by applying to the dried cement on the outsole an activating composition of this invention and corresponding to the following formula:

Example I

| | | |
|---|---|---|
| Butacite (polyvinyl butyral) | grams | 308 |
| Synasol (proprietary denatured ethanol) | do | 612 |
| Acetone | do | 775 |
| Ethyl ether | do | 1350 |
| Yield | gallon | 1 |
| Viscosity of composition | centipoises | 450 |

The activating composition may be applied to the dried marginal band of cement on the outsole through a nozzle, or, if desired, by means of a brush. By reason of its viscous nature, the activating composition may be confined to those areas where its presence is desired.

Promptly after the application of the activating composition to the cement on the surface of the outsole, the outsole and the shoe upper may be placed in juxtaposition, and under attaching pressure preferably of the order of about 80 pounds per square inch. The sole-attaching pressure may be released after about one minute, when the outsole adheres satisfactorily to the shoe upper without the aid of pressure. (By way of contrast, it may be noted that if the polyvinyl butyral solvent ethanol alone is employed to activate the cement on the outsole, the shoe parts must be maintained under attaching pressure for well over 20 minutes before the cement bond will attain sufficient strength to hold the parts together without the aid of pressure.)

Within 3 minutes after removal of the attaching pressure, the adhesive bond between the outsole and the shoe upper has exhibited a strength of from 9 to 15 pounds, as measured in a Scott Tester.

In the activating composition of the invention illustrated above (Example I), it will be noted that the polyvinyl butyral is present to the extent of about 10% by weight of the composition. The liquid vehicle itself comprises about 22% by weight of polyvinyl butyral solvent, namely ethanol, and about 78% of non-solvent for polyvinyl butyral, namely acetone and ethyl ether. Acetone swells but does not dissolve polyvinyl butyral and hence is regarded as a non-solvent.

Other examples of activating compositions suitable for the purposes of the invention and coming within the scope thereof are as follows:

*Example II*

|  | Grams |
|---|---|
| Butvar (polyvinyl butyral) | 50 |
| Methyl acetate | 150 |
| Synasol (proprietary denatured ethanol) | 125 |
| Ethyl ether | 225 |

*Example III*

|  | Grams |
|---|---|
| Butvar (polyvinyl butyral) | 70 |
| Methyl acetate | 150 |
| Synasol (proprietary denatured ethanol) | 125 |
| Ethyl ether | 225 |

*Example IV*

|  | Grams |
|---|---|
| XYSG (polyvinyl butyral) | 60 |
| Synasol (proprietary denatured ethanol) | 140 |
| Methanol | 20 |
| Acetone | 180 |
| Ethyl ether | 260 |

*Example V*

|  | Grams |
|---|---|
| XYSG (polyvinyl butyral) | 60 |
| Synasol (proprietary denatured ethanol) | 140 |
| Propylene oxide | 65 |
| Acetone | 280 |
| Ethyl ether | 115 |

*Example VI*

|  | Grams |
|---|---|
| XYSG (polyvinyl butyral) | 60 |
| Methyl acetate | 65 |
| Synasol (proprietary denatured ethanol) | 140 |
| Acetone | 115 |
| Ethyl ether | 280 |

*Example VII*

|  | Grams |
|---|---|
| Butvar (polyvinyl butyral) | 50 |
| #89 solvent (du Pont proprietary mixture containing methanol and methyl acetate) | 275 |
| Ethyl ether | 225 |

*Example VIII*

|  | Grams |
|---|---|
| Butacite (polyvinyl butyral) | 60 |
| Synasol (proprietary denatured ethanol) | 140 |
| Acetone | 180 |
| Ethyl ether | 280 |

So far as the liquid vehicles for activating compositions within the scope of the invention are concerned, methanol, ethanol, isopropanol, methyl acetate, propylene oxide, and #89 solvent (du Pont proprietary mixture containing methanol and methyl acetate) are regarded as solvents for polyvinyl butyral. Ethyl ether, isopropyl ether and acetone are regarded as non-solvents of polyvinyl butyral.

Activating compositions of this invention will contain polyvinyl butyral within the general range of about 8% to 12% by weight of the composition and the viscosity of such compositions will be within the range of about 200 to 2000 centipoises. The liquid vehicles in compositions within the scope of this invention will comprise from about 20% to 55% by weight of solvent for the polyvinyl butyral and from about 80% to 45% of the non-solvent.

Having described my invention, what I claim as new and desire to secure by Letters Patent of the United States is:

1. An activating composition for polyvinyl butyral cement comprising polyvinyl butyral to the extent of about 8% to 12% by weight of the composition and a liquid vehicle, the liquid vehicle itself comprising about 22% by weight of ethanol, about 28% by weight of acetone, and about 50% of ethyl ether.

2. An activating composition for polyvinyl butyral cement comprising polyvinyl butyral to the extent of about 8% to 12% by weight of the composition and a liquid vehicle, the liquid vehicle itself consisting of from 20% to 55% by weight of solvent selected from the class consisting of methanol, ethanol, isopropanol, methyl acetate, propylene oxide and mixtures thereof, and the balance non-solvent selected from the class consisting of ethyl ether, isopropyl ether, acetone and mixtures thereof.

FREDERICK V. NUGENT.